United States Patent [19]

Fujiwara et al.

[11] Patent Number: 5,115,240
[45] Date of Patent: May 19, 1992

[54] METHOD AND APPARATUS FOR ENCODING VOICE SIGNALS DIVIDED INTO A PLURALITY OF FREQUENCY BANDS

[75] Inventors: Yoshihito Fujiwara; Tomoko Umezawa; Masayuki Nishiguchi, all of Kanagawa; Makoto Akune, Tokyo; Naoto Iwahashi; Kenzo Akagiri, both of Kanagawa, all of Japan

[73] Assignee: Sony Corporation, Tokyo, Japan

[21] Appl. No.: 586,494

[22] Filed: Sep. 21, 1990

[30] Foreign Application Priority Data

Sep. 26, 1989 [JP] Japan .................. 1-249835
Oct. 25, 1989 [JP] Japan .................. 1-278207

[51] Int. Cl.[5] .................. H03M 7/00
[52] U.S. Cl. .................. 341/51; 381/37
[58] Field of Search .................. 341/50, 51, 54, 64; 381/37, 36, 30, 41, 31; 364/513.5

[56] References Cited

U.S. PATENT DOCUMENTS

4,896,362 1/1990 Veldhuis et al. .................. 381/30
4,949,383 8/1990 Koh et al. .................. 381/31

Primary Examiner—A. D. Pellinen
Assistant Examiner—Brian K. Young
Attorney, Agent, or Firm—Philip M. Shaw, Jr.

[57] ABSTRACT

This invention relates to a digital signal encoding apparatus in which the width of the range in selected to be wider for the higher frequency range of the digital signals divided into a plurality of regions and in which the encoded signals are synthesized for the respective ranges, wherein encoding is controlled as a function of the output detecting the characteristics of the components of the divided frequency ranges and the detection time interval is selected to be longer for the lower frequency to enable more efficient encoding to be performed as a function of the properties of input digital signals.

12 Claims, 8 Drawing Sheets

METHOD AND APPARATUS FOR ENCODING VOICE SIGNALS DIVIDED INTO A PLURALITY OF FREQUENCY BANDS

BACKGROUND OF THE INVENTION

1. Field of the Invention

This invention relates to a digital signal encoding apparatus for encoding input digital signals.

2. Prior Art

As a technique of high efficiency encoding of input signals, there are known encoding techniques by so-called bit allocation, according to which input signals are divided into plural channels on the time or frequency axis and certain numbers of bits are adaptively allocated to the respective channels (bit allocation). Among the above mentioned encoding techniques by bit allocation are so-called sub-band coding (SBC) in which voice signals on the time axis are divided into signals of a plurality of frequency bands for encoding, a so-called adaptive transformation coding (ATC) in which voice signals on the time axis are transformed into signals on the frequency axis by orthogonal transformation and the resulting signals are divided into signals of a plurality of frequency bands for adaptive coding for each frequency band, and a so-called adaptive bit allocation (APC-AB) which is a combination of the above mentioned SBC and APC and in which the voice signals on the time axis are divided into signals of a plurality of frequency bands and the signals of the respective bands are converted into base band or low range signals, after which multiple order linear predictive analyses are performed for predictive coding.

Figure 1:
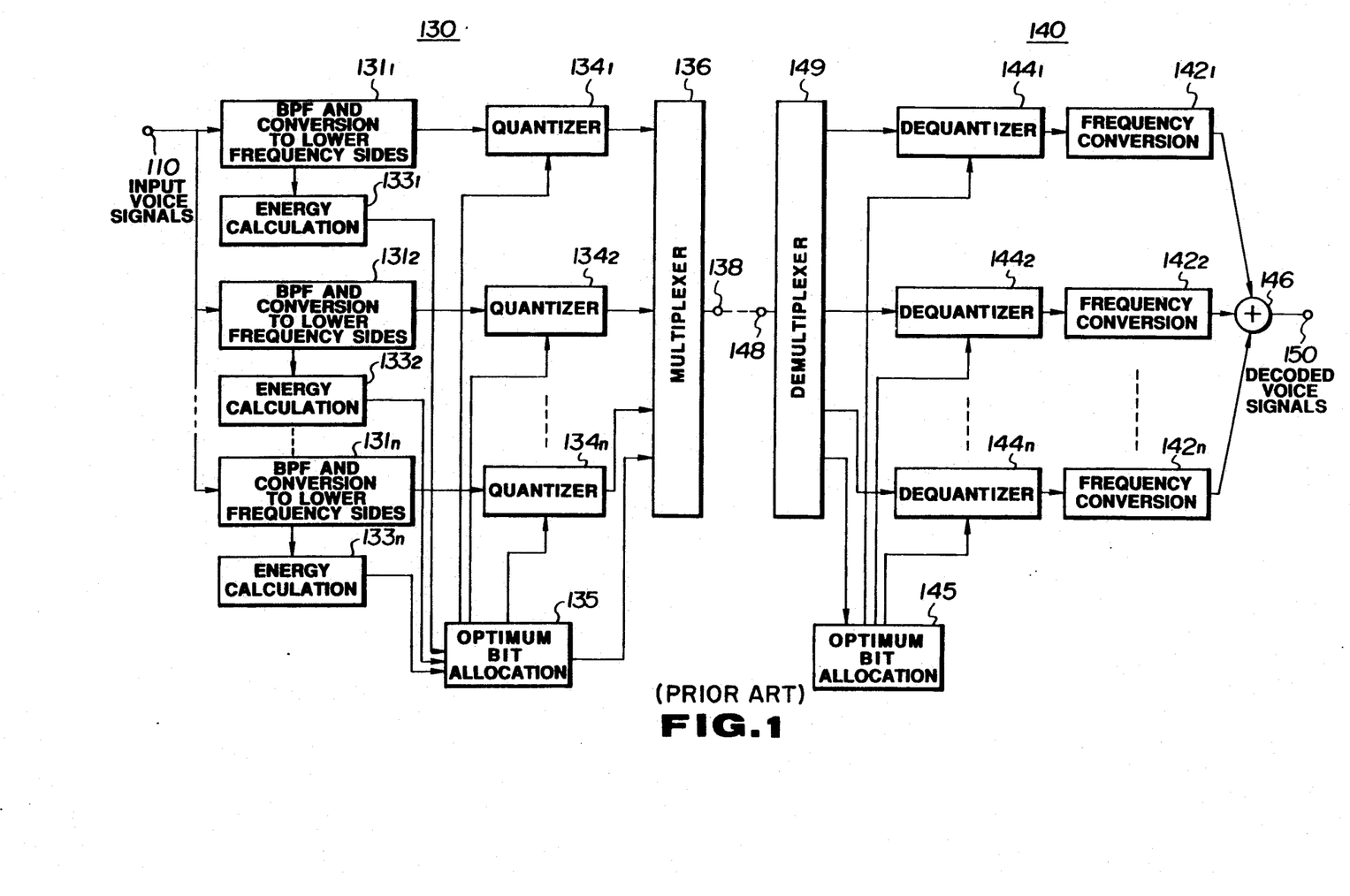
FIG. 1 is a block diagram showing an example of the conventional frequency division and encoding.

The sub-band coding, for example, is performed by a circuit shown in FIG. 1. In this figure, digital voice signals, supplied to an input terminal 110 of an encoder 130, are fed to frequency division filters $131_1$ to $131_n$, which may for example be mirror filters, such as quadrature mirror filters (QMFs), so as to be limited in the frequency range and be shifted to lower frequency sides. That is, in these frequency division filters $131_1$ to $131_n$, the input digital voice signals are divided into separate frequency bands by band-pass filters or BPFs and subsequently passed through low-pass filters so as to be shifted to the lower frequency sides by amounts corresponding to the center frequencies of the pass bands of the LPFs. The signals from the filters are then supplied to quantizers $134_1$ to $134_n$, respectively, to undergo down-sampling at a suitable sampling frequency. It is noted that a higher sampling frequency should be used for a broader frequency band. The signals in which the data have been compressed by requantization in this manner are outputted at terminal 138 by way of a multiplexer 136. The output signals are then transmitted over a transmission channel to a terminal 148 of a decoder 140 and thence to dequantizers $144_1$ to $144_n$ via demultiplexer 149 for decoding. The decoded signals are converted by frequency converters $142_1$ to $142_n$ into signals of the frequency bands on the time axis and adds at a summing junction 146 so as to be outputted at a terminal 150 as the decoded voice signals.

In signal data compression by the encoder 130, quantization bits are adaptively allocated to the respective frequency bands for minimizing the effects of noises produced on data compression of voice signals to improve the quality. The decoder 140 also acquires the bit allocation information by some means or other in performing the decoding.

The conventional practice for acquiring the bit allocation information has been to transmit the energy value information of each frequency band as side information in addition to the signals of the respective bands. In this case, the energy values of signals of the respective bands are computed at energy detection means $133_1$ to $133_n$, from the signals divided into the frequency bands by the frequency division filters $131_1$ to $131_n$ of the encoder 130 and, based on the computed values, the optimum numbers of bit allocation and the steps of quantization at the time of quantization of the signals of the respective bands are found at a allocation-step computing unit 135. The results obtained at the computing unit 135 are used for requantizing the signals of the respective bands at quantizers $134_1$ to $134_n$. The output signals, that is the auxiliary or side information from the allocation-step computing unit 135, are transmitted to an allocation-step computing unit 145 of the decoder 140, and the data from the unit 145 are transmitted to dequantizers $144_1$ to $144_n$, where an inverse operation of that performed at the quantizers $134_1$ to $134_n$ is performed to perform signal decoding.

With the above described frequency division and coding, noise shaping or the like may be taken into account in keeping with human auditory characteristics, and more information may be allocated to those frequency bands in which the voice energies are concentrated or which contribute more to the subjective voice quality, such as clarity. Signal quantization and dequantization for the respective frequency bands are performed with the allocated number of bits for reducing the extent of obstruction of hearing by the quantization noises to reduce the number of bits on the whole. The above mentioned frequency division and coding results in generation of quantization noises only in the frequency band concerned without affecting the remaining bands. Meanwhile, when the energy value information is transmitted as the auxiliary data, as described above, the energy values of the signals of the respective bands may advantageously be employed as the quantization step widths or normalization factors of the respective frequency band signals.

Should the frequency division and coding be applied to musical or voice signals, the frequency band division is usually performed in such a manner that, in order to suit to the frequency analysis capability of the human auditory sense, a narrower bandwidth and a broader bandwidth are selected for the low frequency range and the high frequency range, respectively.

However, with such a frequency band division, suited to the frequency analysis capability of the human auditory sense, if the definition of temporal analyses for the respective frequency bands, that is the time width as the unit of analyses along the time axis, should be the same, the size of the analytic block for each frequency range, that is the number of samples or data, will differ from one frequency range to another because of the difference in the band widths of the frequency bands, with the result that the efficiency of the analytic processing and hence the encoding efficiency are lowered. On the other hand, the constant amplitude period is thought to be longer and shorter for the low and high frequency signals, respectively, so that an efficient encoding consistent with the constant amplitude period cannot be performed.

OBJECT AND SUMMARY OF THE INVENTION

It is therefore an object of the present invention to provide a digital signal encoding apparatus in which, in encoding voice signals divided into a plurality of frequency bands to suit the frequency analysis capability of the human auditory sense, a more efficient encoding consistent with the properties of the voice signals may be achieved.

It is another object of the present invention to provide a digital signal encoding apparatus in which a higher power of frequency resolution is realized for a low frequency range and a higher power of temporal resolution is achieved for the higher frequency range where duration the constant amplitude state is shorter.

According to the present invention, there is provided a digital signal encoding apparatus in which the input digital signals are divided into a plurality of frequency bands which are so set that the bands with higher frequencies will have broader bandwidths, and in which encoded signals are synthesized and outputted for each of said frequency ranges, wherein the improvement resides in that properties of the frequency components of the frequency bands are detected and encoding is controlled as a function of the detection output, and in that the detection time duration is selected to be longer for lower frequencies.

Thus, according to the present invention, the definition of analyses along the time axis is changed as a function of the bandwidths of the respective frequency bands to realize an optimum time interval for analyses for each frequency band.

DESCRIPTION OF THE PREFERRED EMBODIMENTS

By referring to the drawings, certain preferred embodiments of the present invention will be explained in detail.

Figure 2:
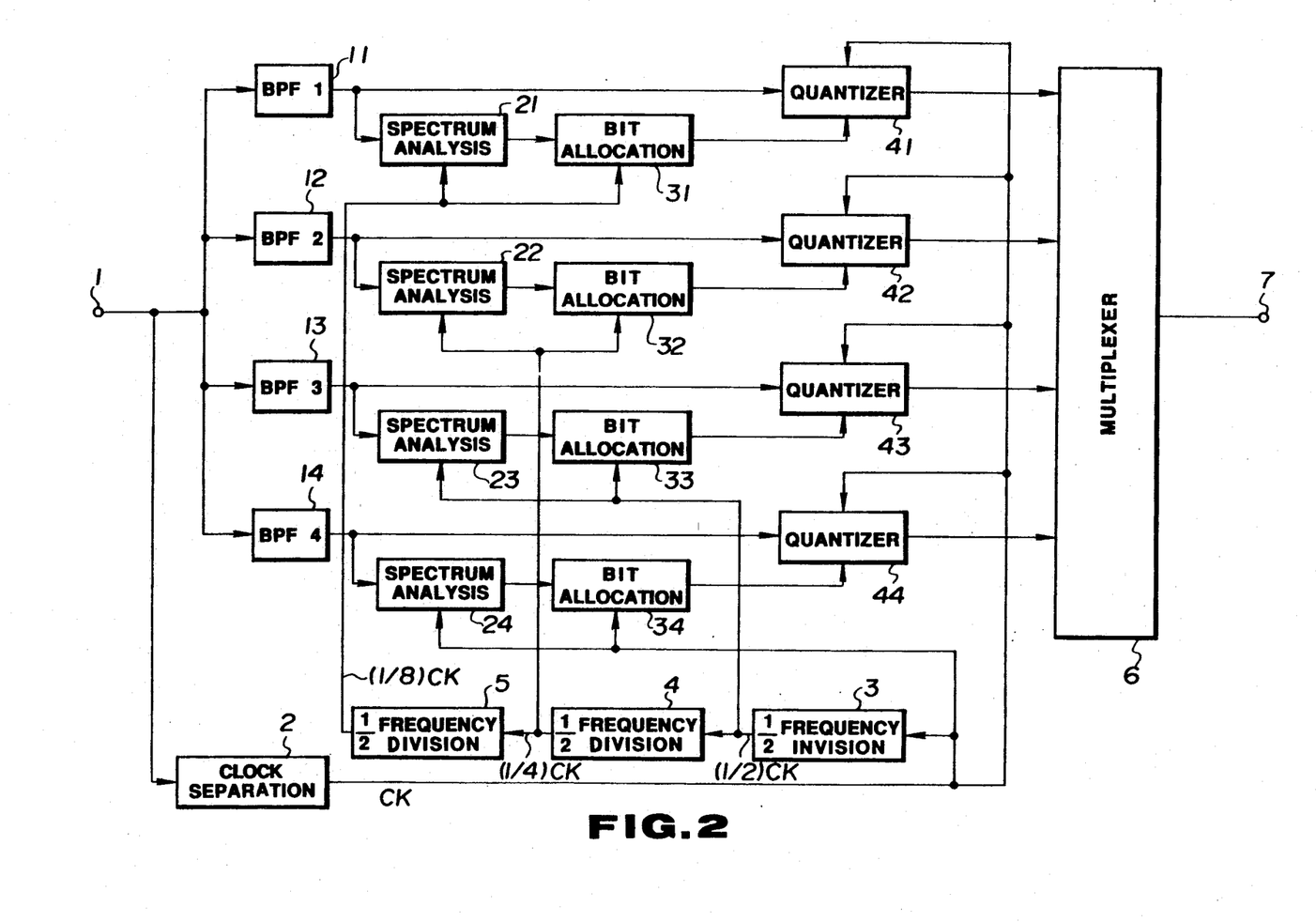
FIG. 2 is a block diagram showing a first embodiment of the present invention.
Figure 3:
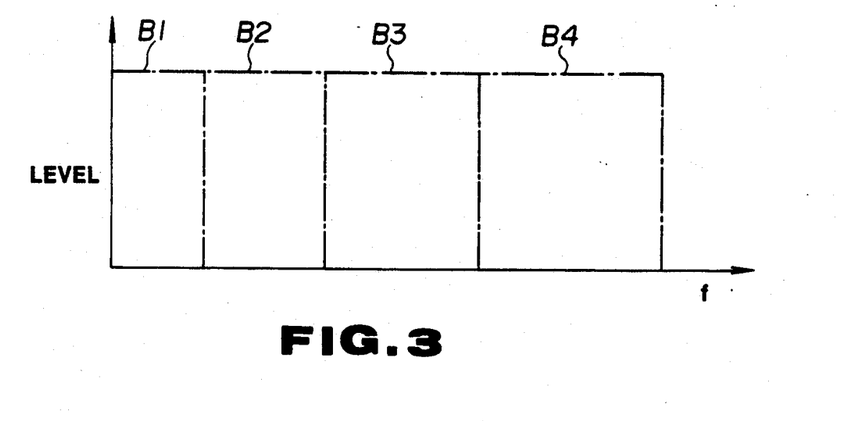
FIG. 3 is a diagrammatic view showing the operation of the embodiment of FIG. 2.

FIG. 2 shows diagrammatically the construction of a digital signal encoding apparatus according to a first embodiment of the present invention, wherein the frequency range is divided into four bands, as shown in FIG. 3.

In FIG. 2, voice signals, for example, are supplied as input digital signals to an input terminal 1 of the digital signal encoding apparatus. These voice signals are first supplied to band-pass filters (BPFs) 11 to 14. These BPF filters divide the frequency range of the voice signals into a plurality of frequency bands so that the bandwidth will become broader for the higher frequency bands so as to suit the frequency discriminating capability of the human auditory sense. Low-pass filters are built in the BPFs 11 to 14 so that the signals are shifted towards the low frequency sides by amounts corresponding to the central frequencies of the pass bands of the BPFs 11 to 14.

The voice signals, thus divided into plural frequency bands and shifted to the lower frequency sides by the BPFs 11 to 14, are divided into frequency bands B1, B2, B3 and B4 by the BPFs 11, 12, 13 and 14, as shown in FIG. 3. These frequency bands B1 to B4 are selected so that the bandwidths will be the broader, the higher the frequencies, as mentioned previously.

The signals of the respective frequency bands are quantized by quantizers 41 to 44. During such quantization, the frequency characteristics of the frequency components of the respective bands are detected by spectrum analysis circuits 21 to 24, respectively; and quantization is controlled as a function of the detected output. That is, with the present encoding apparatus, the numbers of allocated bits at the time of quantization are determined on the basis of the results of the signal spectral analyses for the respective frequency bands, and quantization at the quantizers 41 to 44 is performed on the basis of the so determined numbers of bit allocation.

Thus the signals of the respective frequency bands from the BPFs 11 to 14 are transmitted to spectrum analysis circuits 21 to 24, respectively, where spectral analyses for the refractive frequency bands are performed. The results of the analyses are transmitted to bit allocation numbers decision circuits 31 to 34 which allocate the number of the bits at the time of quantization, so that the bit allocation numbers are determined at the circuits 31 to 34 on the basis of the results of the analyses. Quantization at the quantizers 41 to 44 are performed on the basis of the so determined bit allocation numbers. Quantization outputs of the quantizers 41 to 44 are synthesized by a multiplexer 6 so as to be outputted at an output terminal 7 of the digital signal encoding apparatus of the present embodiment.

It is noted that, in quantizing the voice signals previously divided into plural frequency bands to suit the frequency analysis capability of the human auditory sense, since the bandwidths of the respective frequency bands differ from one frequency band to another, the block sizes of the spectral analyses, that is the widths along the time axis of the analytic blocks, will differ from one frequency band to another for the same assumed precision in definition of the analyses along time axis of the frequency bands, with the result that the efficiency of the spectral analyses, and hence the quantization efficiency, are lowered. Since it is thought in general that the constant amplitude domain of the low frequency range signal is longer and that of the high frequency range signal is shorter, an efficient coding taking such difference in the length of the constant amplitude domain cannot be realized.

With this in view, the temporal analytic accuracy, that is, the analytic accuracy along the time axis, is selected to be higher and lower for the high and low frequency range, respectively, for realizing a more efficient quantization. In other words, the durations of the spectral analyses are selected to be shorter and longer for the high and low frequency ranges, respectively.

That is, for spectral analyses by the spectral analysis circuits 21 to 24, the period of the analyses, which is the detection time interval or the time width as a unit of the analyses along the time axis, is selected to be the longer, the lower the frequency. Selection of the detection time intervals for spectral analyses as a function of the frequencies may be made on the basis of each of the clock signals obtained upon dividing the clock frequency of the clock signals contained in the voice signals.

Thus, in the present embodiment, the clock signal components in the voice signals supplied to the input terminal 1 are separated in a clock separation circuit 2. The so separated clock signals CK are sequentially transmitted through ½ frequency dividers 3, 4 and 5 to produce frequency-divided clock signals (½) CK, divided to one half the original clock frequency CK, frequency-divided clock signals (¼) CK, divided to one-fourth the original clock frequency CK and frequency-divided clock signals (⅛) CK, divided to one-eighth the original clock frequency CK. Of the so-produced clock signals, the clock signals CK are transmitted to a spectrum analysis circuit 24 and a bit allocation number decision circuit 34, the frequency-divided clock signals (½) CK are transmitted to a spectrum analysis circuit 23 and a bit allocation number decision circuit 33, the frequency-divided clock signals (¼) CK are transmitted to a spectrum analysis circuit 22 and a bit allocation number decision circuit 32 and the frequency-divided clock signals (⅛) CK are transmitted to a spectrum analysis circuit 21 and a bit allocation number decision circuit 31.

Hence, the detection time duration of the spectral analyses, that is, the unit time width for the analyses, becomes maximum at the spectrum analysis circuit 21, while it becomes progressively shorter at the spectrum analysis circuit 22 and 23, becoming shortest at the spectrum analysis circuit 24.

By changing the detection time intervals for spectral analyses in this manner, it becomes possible to realize efficient spectral analyses and hence efficient quantization at the time of quantizing the voice signals divided into a plurality of frequency bands to suit the frequency analysis capability of the human auditory sense. With the detection time interval thus changed, the spectrum for each frequency band may be thought to be constant in each block of the band, so that the values of the spectrum analyses for the long-time block may be used in the lower frequency range in substitution for the short-time spectral waveform.

Meanwhile, the division ratio of the frequency range need not necessarily be inversely proportionate to the time durations for spectrum analyses, that is the time durations bearing the ratios of 8:4:2:1 to the frequency of the clock signals CK. However, the relative magnitude of the division ratio is preferably selected in the above described manner. Such relative magnitude is in keeping with the direction in which the block size of the spectral analyses, that is the width of the analytic block along the time axis, may be made the same, so that the efficiency is not lowered.

Although the bit allocation numbers for quantization are determined in the above embodiment by the spectral analyses, the bit allocation numbers for quantization may also be determined using floating coefficients for a so-called block floating operation.

Figure 4:
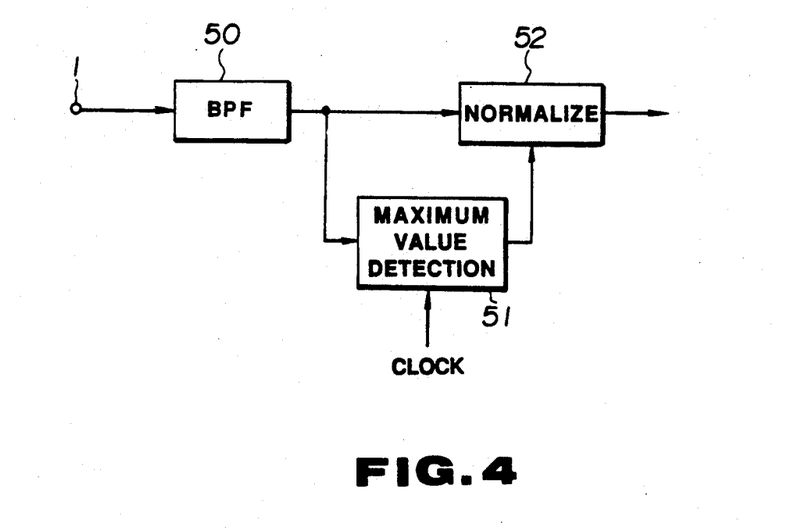
FIG. 4 is a block diagram for illustrating a modified quantization system.

FIG. 4 shows a portion of the digital signal encoding apparatus of the present embodiment responsible for only one frequency band.

In this figure, voice signals at an input terminal 1 are passed through a band-pass filter (BPF) 50 where the signals of a predetermined frequency band are taken out as a block which is then transmitted to a maximum value detection circuit 51 adapted for detecting the maximum value data in the block. In this maximum value detection circuit 51, the maximum value data in the block is detected, and the floating coefficient for the block floating operation is found on the basis of the maximum value data.

In detecting the floating coefficient, if the same degree of accuracy is used for temporal analyses of the respective frequency bands, the efficiency of detection of the floating coefficients and hence the quantization efficiency tends to be lowered, while it is not possible to perform efficient encoding in accordance with the constant-amplitude domains.

Thus the maximum value detection circuit 51 is fed with the frequency-divided clock signals shown in FIG. 2 and the precision of definition along the time axis of the floating coefficient or the analysis time interval of the floating coefficient is determined on the basis of these frequency-divided clock signals. That is, in the present embodiment, the precision of definition along the time axis is selected to be higher and lower for the high and low frequencies, respectively, for realizing more efficient quantization.

The floating coefficients, for which the time intervals for analyses have been determined in this manner, are transmitted to a normalization circuit 52. The aforementioned block data are also supplied to the normalization circuit 52, so that the block data are processed in the normalization circuit 52 by block floating on the basis of the above mentioned floating coefficients, and the blocks thus processed by block floating are quantized subsequently.

Since the block floating also is preferably performed in the constant-amplitude signal domain, the time interval of the floating coefficient for the constant-amplitude signal domain is selected to be longer for the low frequency range where the constant-amplitude domain is longer for realizing efficient block floating.

That is, in the above described first embodiment of the digital signal encoding apparatus of the present invention, encoding is controlled in accordance with the detection output of the characteristics of the components of the frequency bands, while the detection time interval is selected to be longer for the lower frequencies, with the result that the detection efficiency is not lowered and hence efficient encoding suited to the nature of the input digital signals may be achieved.

A second embodiment of the present invention will be hereinafter explained by referring to FIG. 5 et seq.

Figures 5, 6:
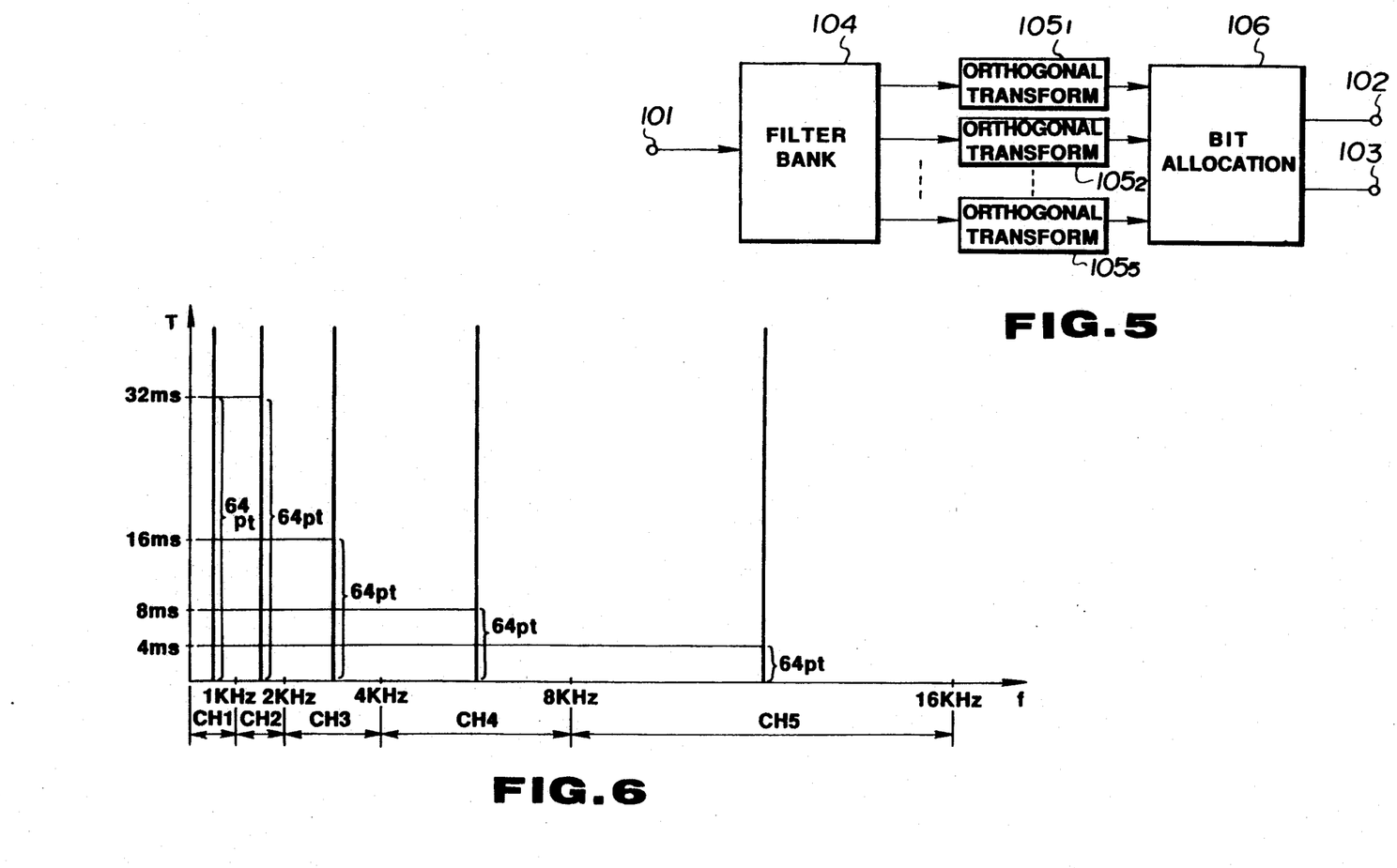
FIG. 5 is a block diagram showing a second embodiment of the present invention.
FIG. 6 is a diagrammatic view for illustrating the operation of the second embodiment shown in FIG. 5.

FIG. 5 shows diagrammatically a typical construction of a high efficiency encoding apparatus for digital data according to the second embodiment.

Referring to FIG. 5, the high efficiency encoding apparatus for digital data according to the present embodiment is constituted by a filter bank 104, made up of mirror filters, such as quadrature mirror filters, as the frequency division filters, orthogonal transform circuits $105_1$ to $105_5$ for performing an orthogonal transform, that is a transform of the time axis into the frequency axis, such as fast Fourier transform, and a bit allocation number decision circuit 106 for determining the bit numbers allocated to the respective frequency bands.

To the input terminal 101 are supplied 0 to 16 kHz input digital data obtained upon sampling audio signals with a sampling frequency fs=32 kHz. These input data are transmitted to the filter bank 104, by means of which the inputu data are divided into a plurality n of, herein five, frequency bands so that the bandwidths become broader for higher frequencies. Thus the input digital data are divided roughly into five channels, that is a channel CH1 with the frequency band of 0 to 1 kHz, a channel CH2 with the frequency band of 1 to 2 kHz, a channel CH3 with the frequency band of 2 to 4 kHz, a channel CH4 with the frequency band of 4 to 8 kHz and a channel CH5 with the frequency band of 8 to 16 kHz, as shown in FIG. 6. Such frequency division in which the bandwidth becomes broader for higher frequencies is a frequency division technique taking human auditory characteristics into account, similarly to the so-called critical band. The critical band, which takes the human auditory characteristics into account, means the band occupied by a narrow band noise masking a pure tone or sound, wherein the noise has the same amplitude as and encompassing the level or pitch of the pure tone or sound, wherein, the higher the frequency, the broader becomes the bandwidth of the critical band. For each of these five channels, blocks each consisting of a plurality of samples, that is a unit time block, are formed by the orthogonal transform circuits $105_1$ to $105_5$ and orthogonal transform, such as a fast Fourier transform, is performed for each unit time block of each channel to produce coefficient data by the orthogonal transform, such as the FFT coefficient data for FFT. The coefficient data of the respective channels are transmitted to the bit allocation number decision circuit 106, where the bit allocation number data for the respective channels are formed and the coefficient data for the respective channels are quantized. The encoder output is outputted at an output terminal 102, while the bit allocation number data are outputted at an output terminal 103.

In this manner, by constituting the unit time blocks from channel data having broader bandwidths for higher frequencies, the number of samples in the unit time block becomes smaller for the low frequency channels of narrower bandwidths, while becoming larger for the high frequency channels of broader bandwidths. In other words, the frequency resolution becomes lower and higher for the low and high frequency regions, respectively. By performing orthogonal transformation of each of the time blocks of the respective channels, the coefficient data by the orthogonal transformation may be obtained at each channel over the full frequency range at an equal interval on the frequency axis, so that the same high frequency resolution may be realized at both the high and low frequency sides.

If the human auditory characteristics are considered, while the frequency resolution power needs to be high in the low frequency range, it need not be so high in the high frequency range. For this reason, with the present embodiments, the unit time block in which the orthogonal transform is performed is composed of the same number of sample data for each band or channel. In other words, the unit time block has different block lengths from one channel to another, in such a manner that the low range has a longer block length and the high range has a shorter block length. That is, the power of frequency resolution is maintained at a higher value for the lower frequency range while it is set so as not to be higher than is necessary for the higher frequency range and the power of temporal resolution is set to be high for the higher frequency range.

It is noted that, with the present embodiment, the blocks with the same number of samples are subjected to orthogonal transform for channels CH1 to CH5, so that the same number of coefficient data, such as 64 point (pt) coefficient data, may be obtained in the respective channels. In this case, the channel block length is 32 ms for channel CH1, 32 ms for channel CH2, 16 ms for channel CH3, 8 ms for channel CH4 and 4 ms for channel CH5. If the fast Fourier transform is performed by way of the aforementioned orthogonal transform, the amount of processing is $64 \log_2 64$ for channels CH1 and CH2, $64 \log_2 64 \times 2$ for channel CH3, $64 \log_2 64 \times 4$ for channel CH4 and $64 \log_2 64 \times 8$ for channel CH5, in the example of FIG. 6. In case of the fast Fourier transform for the full frequency range, the amount of processing is $1024 \log_2 1024 = 1024 \times 10$ for the sampling frequency fs=32 kHz and the coefficient data is 1024 pt for the block length equal to 32 ms.

Figure 9:
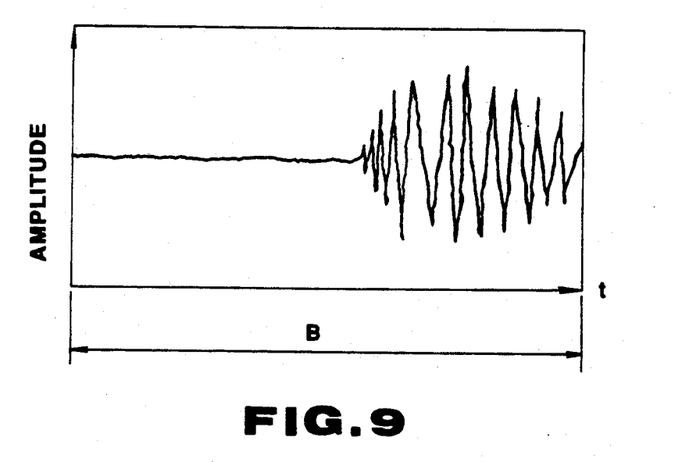
FIGS. 9 and 10 are charts for illustrating the operation of the embodiment shown in FIG. 5.
Figure 10:
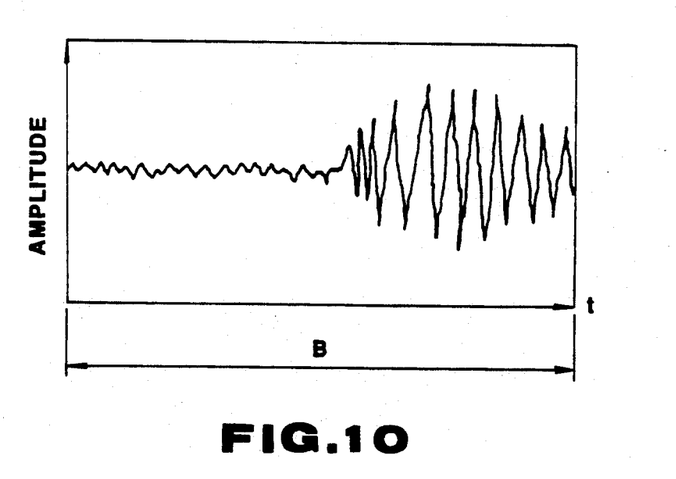

With the above described construction of the present embodiment, a high power of frequency resolution may be obtained at the low frequency range which is critical for the human auditory sense, while the requirement for a higher temporal resolution necessary with transient signals rich in high frequency components as shown in FIG. 9 may also be satisfied. The filter bank, the orthogonal transform circuits or the like may be those used conventionally so that the construction may be simplified and reduced in costs and the delay time in each circuit of the apparatus may be diminished.

Figure 7:
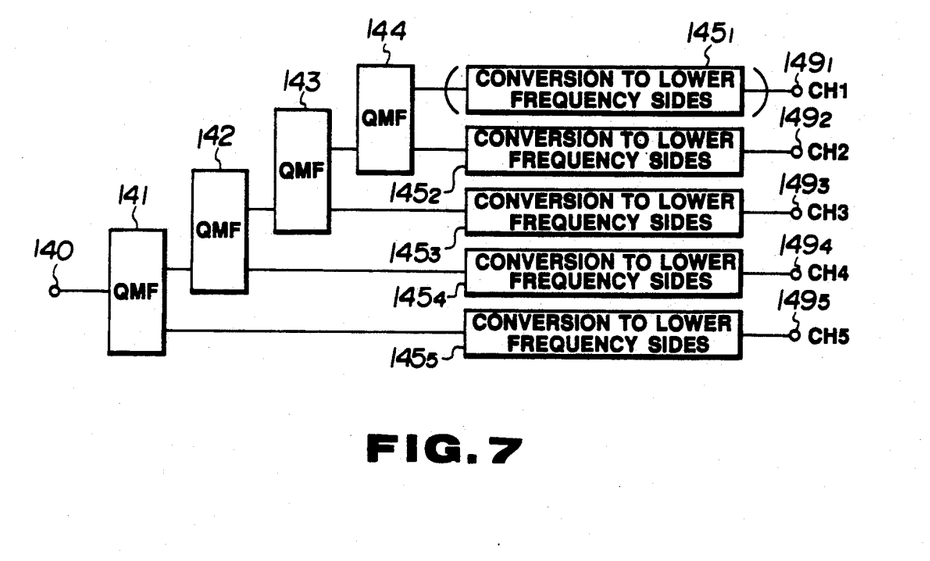
FIG. 7 is a block diagram showing the filter bank of FIG. 5 in detail.

FIG. 7 shows the concrete construction of the filter bank 104. In this figure, the 0 to 16 kHz input digital data with the sampling frequency fs=32 kHz is supplied to an input terminal 140 of the filter bank 104. These input digital data are first supplied to a filter QMF 141 where the 0 to 16 kHz input digital data are divided into 0 to 8 kHz output data and 8 to 16 kHz output data, of which the 8 to 16 kHz output data are supplied to a low range conversion circuit $145_5$. The 8 to 16 kHz data undergo down-sampling in the low range conversion circuit $145_5$ to generate 0 to 8 kHz data, which are outputted at output terminal $149_5$. The 0 to 8 kHz output from QMF 141 is transmitted to a filter QMF 142, where it is similarly divided into a 4 to 8 kHz output transmitted to a low range conversion circuit $145_4$ and a 0 to 4 kHz output transmitted to a QMF 143. The 0 to 4 kHz data, converted into the base band data, are obtained at the low range conversion circuit $145_4$ so as to be outputted at output terminal $149_4$. Similarly, a 0 to 2 kHz output and a 2 to 4 kHz output are produced at filter QMF 143, while a 0 to 1 kHz output and a 1 to 2 kHz output are produced at filter QMF 144, so as to be converted into low range signals in low range conversion circuits $145_3$ to $145_1$ before being outputted at output terminals $149_3$ to $149_1$. These outputs are transmitted via channels CH1 to CH5 to the orthogonal transform circuits $105_1$ to $105_5$, meanwhile, the low frequency conversion circuit $145_1$ may be omitted if so desired.

Figure 8:
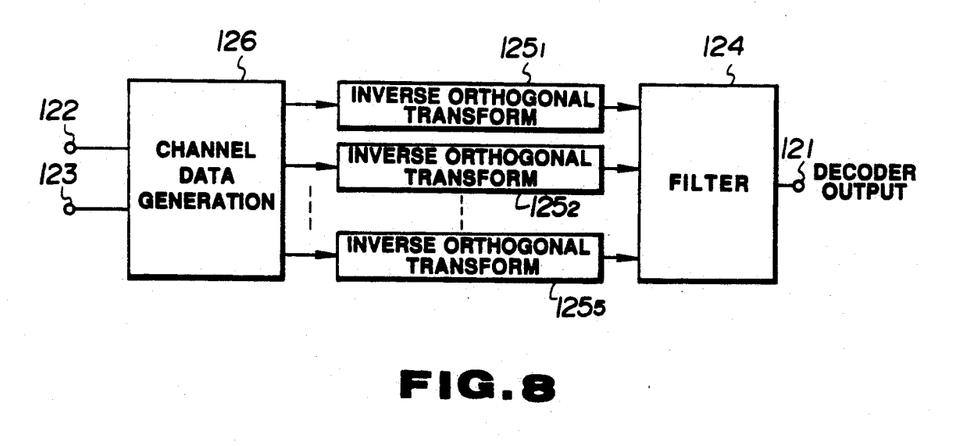
FIG. 8 is a block diagram showing a decoder corresponding to the embodiment of FIG. 5.

FIG. 8 shows the construction of a decoder. In this figure, the above mentioned encoder output is supplied to an input terminal 122, while the above mentioned bit allocation number information is supplied to an input terminal 123. These data are supplied to a channel information generator 126 where the data of the encoder output are restored into coefficient data of the respective channels on the basis of the bit allocation number information. These restored coefficient data are transmitted to inverse orthogonal conversion circuits $125_1$ to $125_5$ where an inverse operation to that in the orthogonal conversion circuits $105_1$ to $105_5$ is performed to produce data in which the frequency axis is converted into the time axis. The data of the respective channels on the time axis are decoded by a synthesis filter 124 before being outputted as the decoder output at output terminal 121.

In forming the bit allocation information for each channel in the bit allocation number decision circuit 106 of FIG. 5, the allowable signal noise level is set and the masking effect is taken into consideration at this time so that the allowable noise level will be higher for the higher band frequency for the same energy value for determining the allocation bit number for each band. The masking effect means both the masking effect for signals on the time axis and that for signals on the frequency axis. That is, by such masking effect, any noise in the masked signals, if any, may not be heard. Hence, in the actual audio signals, any noises in the masked signals on the frequency axis are allowable noises, so that, during quantization of the audio data, it becomes possible to diminish the number of the allocated bits corresponding to the allowable noise level.

In the above described second embodiment of the high efficiency encoder for digital data, the input digital data are divided into a plurality of bands so that the bandwidth will become broader for the higher frequency range, blocks each consisting of a plurality of samples are formed for each band and orthogonal transform is performed for each of the blocks so as to produce the coefficient data to realize encoding with a higher frequency resolution power. The orthogonal transform block consists of the same number of sample data for each band, so that a high power of frequency resolution required for the lower frequency range may be realized, while the requirement for a high power of temporal resolution for transient signals rich in high frequency components may also be satisfied.

In this manner a highly efficient encoding consistent with the human auditory characteristics may be achieved. The construction for implementing the encoder of the present embodiment may be simple and inexpensive since the components may be those used conventionally.

Figure 11:
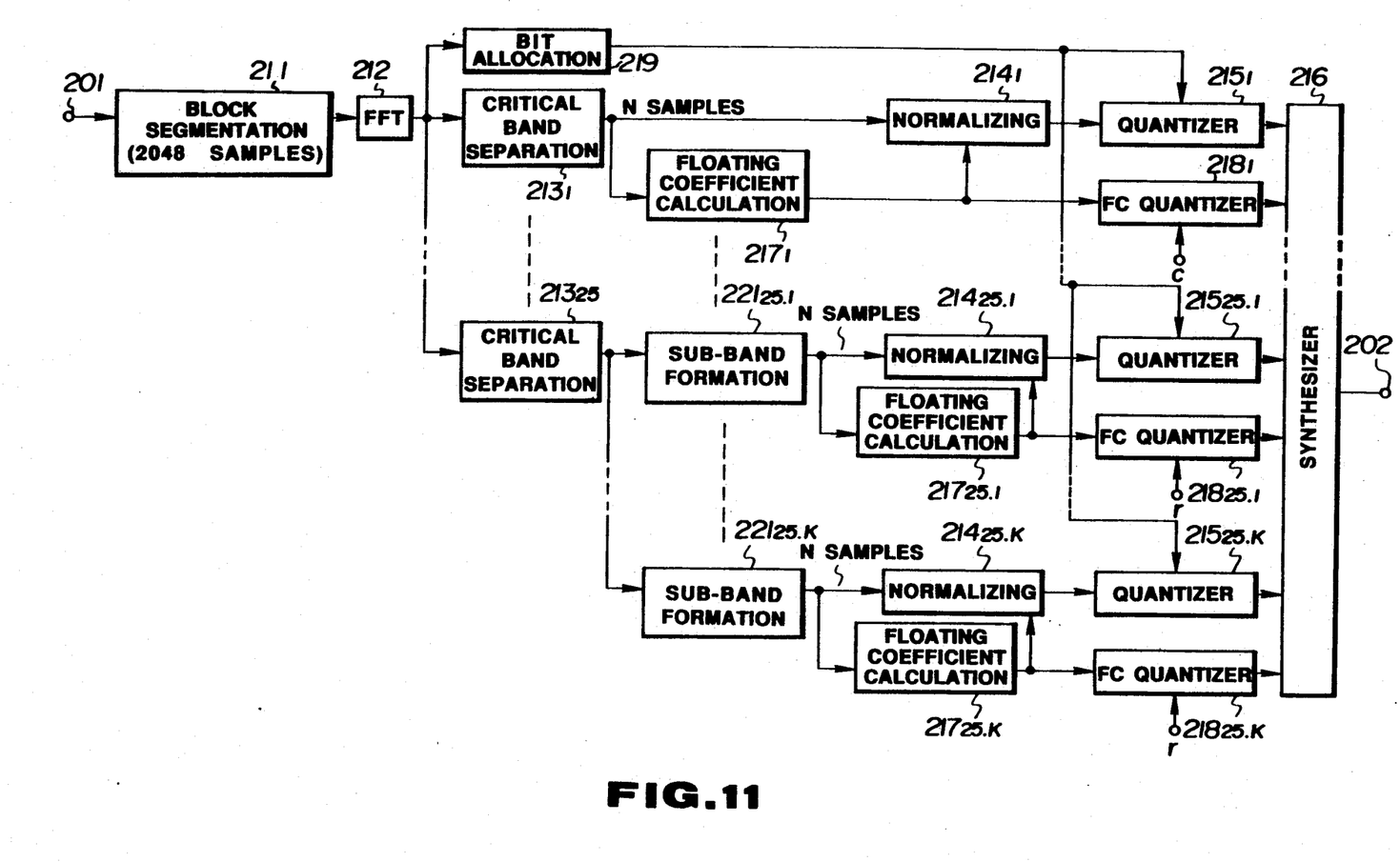
FIG. 11 is a block diagram showing a third embodiment of the present invention.

A third embodiment of the present invention will be hereinafter explained by referring to FIG. 11 showing, as a typical example of high efficiency encoding, a high efficiency encoder in which the above mentioned adaptive transform coding is applied.

In FIG. 11, the input digital data are transmitted via input terminal 201 to a block forming circuit 211 where they are formed into blocks at a predetermined time interval before being transmitted to a fast Fourier transform (FFT) circuit 212. In this FFT circuit 212, the data in the form of unit time blocks are converted into data on the frequency axis. Assuming that the FFT operation for 2048 samples is to be performed, the FFT coefficient data expressed by the phase angle of 1023 points and the amplitude point of 1025 points (or the imaginary number part of 1023 points and the real number part of 1025 points), may be found. These FFT coefficient data are transmitted to critical band separation circuits $213_1$ to $213_{25}$ where they are divided into, for example, 25 critical bands so as to be formed into blocks.

Since the band or block width becomes progressively broader for the higher frequency range, the number of samples in one block becomes larger for the higher frequency range than for the lower frequency range. In such case, the efficiency of block floating for the higher frequency range, which will be explained subsequently, becomes lower.

Thus, with the present embodiment, an approximately equal number of samples of the data of the respective bands are collected and arranged into a block form. That is, the numbers of data in the blocks are approximately equal. For example, $N$ sample (FFT coefficient data) are collected along the frequency axis into one block. Referring to the signal path downstream of the critical band separation circuit $213_1$, $N$ samples (one block) are outputted from the critical band separating circuit $213_1$. This block is transmitted to the normalization circuit $214_1$, while also being transmitted to a floating coefficient computing circuit $217_1$. In the computing circuit $217_1$, the floating coefficient is computed and transmitted to the normalization circuit $214_1$, where the floating operation for the block is performed with the use of the floating coefficient for normalization. The output of the normalization circuit $214_1$ is transmitted to the quantization circuit $215_1$ for quantizing the normalized block. The quantization is performed on the basis of the bit number information from a bit allocation number decision circuit 219 determining the number of the bits allocated to the respective critical bands. The output from the quantizer $215_1$ is supplied to a synthesizer 216. The floating coefficient is quantized in a floating coefficient quantization (FC quantization) circuit $218_1$, with a predetermined number of bits c for each block as a unit, before being transmitted to the synthesizer 216. The quantization outputs from the block and the quantization output of the floating coefficient are synthesized in the synthesizer 216 so as to be outputted at an output terminal 202.

It is noted that, for maintaining the block floating operation at the higher frequency range and achieving effective bit allocation which takes human auditory characteristics into account, the FC quantization circuit is adapted to perform quantization with or number of bits which is the lesser the higher the frequency of the floating coefficient. That is, with the present high efficiency encoding apparatus, $k$ blocks each consisting of $N$ consecutive samples are generated from each band for the high frequency range having a broader band width and a larger number of samples, wherein k denotes a natural number which differs from one band to another. Taking an output of the critical band separating circuit $213_{25}$ of the high frequency range as an example, the output of the critical band separating circuit $213_{25}$ is transmitted to $k$ sub-band forming circuits $221_{25,1}$ to $221_{25,k}$ from which the blocks each consisting of $N$ consecutive samples are generated. These blocks are processed by the normalization circuits $214_{25,1}$ to $214_{25,k}$, floating coefficient computing circuits $217_{25,1}$ to $217_{25,k}$, quantization circuits $215_{25,1}$ to $215_{25,k}$ and by the FC quantization circuits $218_{25,1}$ to $218_{25,k}$, similar to those downstream of the critical band separating circuits $214_{25,1}$ to $214_{25,k}$ before being transmitted to the synthesize 216.

At this time, in the FC quantization circuits $218_{25,1}$ to $218_{25,k}$, the floating coefficients have been quantized on the block-by-block basis with the number of bits r lesser than the predetermined number of bits c at the FC quantization circuit 218, (c>r). Meanwhile, the numbers of samples N of the respective bands are provided so as to be uniform to some extent.

Figure 12:
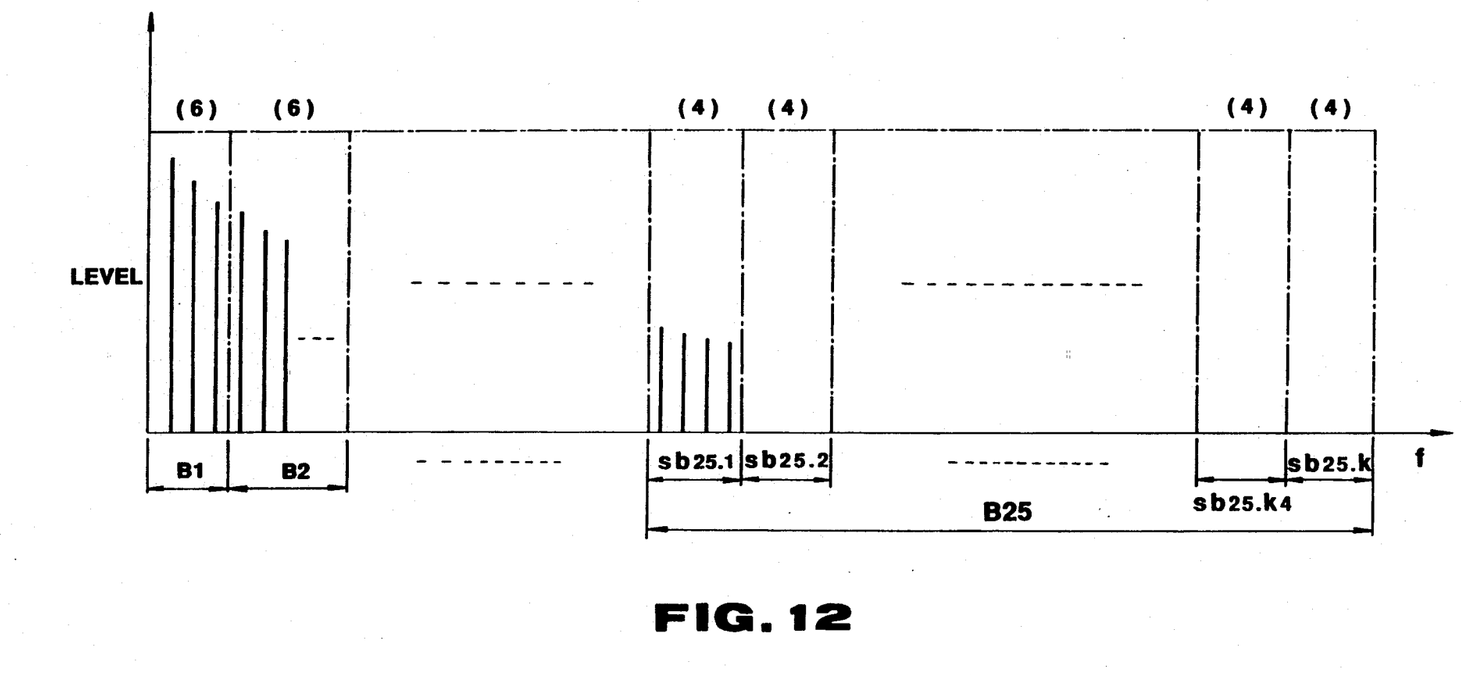
FIG. 12 is a chart for illustrating the operation of the embodiment of FIG. 11.

As shown for example in FIG. 12, a predetermined number of bits r lesser than the predetermined number of bits c for the lower range bands, such as band $B_1$, $B_2$, ... among the critical bands B1 to B25, are provided to k sub-bands $sb_{25,1}$ 1 to $sb_{25,1}$ k in a higher range band such as band B25, and quantization is performed with the number of bits r. The predetermined numbers of the bits may for example be 6 for the bands B1 and B2 and 4 for band B25, that is, four bits each of the sub-bands sb 25, 1 to sb $25_1$ k, as shown in brackets in the drawing. Although not shown, 6 bits, 5 bits and 4 bits may be provided to bands B1 to B5, B6 to B15 and bands B16 to B25, respectively. In determining the numbers of floating coefficient quantization bits, the number of the bits may be adjusted with the data dispersion in the block taken into consideration. In this case, the numbers of allocation bits for the floating coefficients are decreased for the blocks with larger dispersion.

With the above described third embodiment, since the predetermined numbers of bits are provided to the sub-bands of the high frequency range at the time of quantization of the floating coefficients, it does not occur that the numbers of the bits of the floating coefficients per sample in the frequency band in the high frequency range be decreased drastically as compared to the numbers of the bits for the low frequency range, even in cases wherein the band or block width is enlarged for the high frequency range, such as in the above mentioned critical bands, so that it becomes possible to prevent the effect of the block floating in the high frequency range from being lowered. On the other hand, the floating coefficients of the higher frequency range are quantized with the smaller number of the bits, so that bits may be used more efficiently at the high frequency region where the larger number of the bits in not required in view of the human auditory characteristics.

What is claimed is:

1. A digital signal encoding method of the type in which input digital signals are divided into a plurality of frequency bands which are so set that the bands with higher frequencies will have broader bandwidths, and in which encoded signals are synthesized and outputted for each of the frequency bands, wherein the improvement resides in the steps of:
   detecting by spectral analyses properties of the frequency components of the frequency bands, with the period of the spectral analyses, which is the detection time interval or the time width as a unit of the analyses along the time axis, being selected to be longer for lower frequencies, and generating a corresponding detection output signal; and
   controlling the synthesizing and encoding as a function of the detection output signal.

2. The digital signal encoding method according to claim 1 wherein the input digital signals have a given sampling rate determined by a clock signal and in the step of detecting the properties of the frequency components the frequency of clock signals used in the spectral analysis are derived from the sampling rate clock signal and are selected to be lower for lower frequency bands.

3. A high efficiency digital data encoding method comprising the steps of:
   dividing input digital data into a plurality of bands so that the bandwidths thereof will become progressively broader for higher frequency bands;
   forming a plurality of blocks, each consisting of a plurality of samples of the divided input digital data, for each band; and
   performing orthogonal transformation of each block of the bands to generate coefficient data.

4. The method according to claim 3 wherein the block in which the orthogonal transformation is performed is composed of the same numbers of the sample data for the respective bands.

5. A high efficiency encoding method of the type in which input digital data are converted into data on the frequency axis to produce data divided according to predetermined frequency bands, the data of the respective bands are formed into blocks by selecting the bandwidths to be broader for the high frequency ranges to compute the floating coefficients for the respective blocks, a floating operation for the respective blocks is performed with the floating coefficients, and the floating coefficients are quantized, wherein the improvement resides in that:
   in the step of forming the data of the respective bands into blocks, the number of the data in each block are selected to be approximately equal; and
   in the step of quantizing the floating coefficients, the floating coefficients for the high frequency ranges are quantized in such a manner that the numbers of bits are progressively smaller for the floating coefficients of the higher frequency ranges.

6. A digital signal encoding apparatus of the type including means for dividing input digital signals into a plurality of frequency bands which are so set that the bands with higher frequencies will have broader bandwidths and means for synthesizing and outputting encoded signals for each of the frequency bands, wherein the improvement comprises:
   means for detecting by spectral analyses properties of the frequency components of the frequency bands, with the period of the spectral analyses, which is the detection time interval or the time width as a unit of the analyses along the time axis, being selected to be longer for lower frequencies, and generating a corresponding detection output signal; and
   means for controlling the synthesizing and encoding as a function of the detection output signal.

7. The digital signal encoding apparatus according to claim 6 wherein the input digital signals have a given sampling rate determined by a clock signal and the means for detecting includes means for deriving clock signals from the sampling rate clock signal and the frequency of these clock signals used in the spectral analysis are selected to be lower for lower frequency bands.

8. A high efficiency digital data encoding apparatus comprising:
   means for dividing input digital data into a plurality of bands so that the bandwidths thereof will become progressively broader for higher frequency bands;
   means for forming a plurality of blocks, each consisting of a plurality of samples of the divided input digital data, for each band; and
   means for performing orthogonal transformation of each block of the bands to generate coefficient data.

9. The apparatus according to claim 8 wherein the block in which the orthogonal transformation is performed is composed of the same numbers of the sample data for the respective bands.

10. A high efficiency encoding apparatus of the type which includes means for converting input digital data into data on the frequency axis to produce data divided according to predetermined frequency bands, means for forming the data of the respective bands into blocks by selecting the bandwidths to be broader for the high frequency ranges to compute the floating coefficients for the respective blocks, means for performing a floating operation for the respective blocks with the floating coefficients, and means for quantizing the floating coefficients, wherein the improvement comprises:

that the means for forming the data of the respective bands into blocks selects the number of the data in each block to be approximately equal; and the means for quantizing the floating coefficients quantizes the floating coefficients for the high frequency ranges in such a manner that the numbers of bits are progressively smaller for the floating coefficients of the higher frequency ranges.

11. A digital signal encoding method of the type in which input digital signals are divided into a plurality of frequency bands which are so set that the bands with higher frequencies will have broader bandwidths, and in which encoded signals are synthesized and outputted for each of the frequency bands, wherein the improvement resides in the steps of:

detecting properties of the frequency components of the frequency bands, with the time duration of this detection of the properties of the frequency components being selected to be longer for lower frequencies, and generating a corresponding detection output signal, wherein the step of detecting the properties of the frequency components includes a spectrum analysis step and wherein the frequency of clock signals used in the spectral analysis step is selected to be lower for clock signals for lower frequency bands; and controlling the synthesizing and encoding as a function of the detection output signal.

12. A digital signal encoding apparatus of the type including means for dividing input digital signals into a plurality of frequency bands which are so set that the bands with higher frequencies will have broader bandwidths and means for synthesizing and outputting encoded signals for each of the frequency bands, wherein the improvement comprises:

means for detecting properties of the frequency components of the frequency bands, with the time duration of this detection of the frequency components being selected to be longer for lower frequencies, and generating a corresponding detection output signal, wherein the means for detecting the properties of the frequency components includes a spectrum analysis means and wherein the frequency of clock signals used in the spectral analysis means is selected to be lower for clock signals for lower frequency bands; and means for controlling the synthesizing and encoding as a function of the detection output signal.

* * * * *